United States Patent [19]
Kale et al.

[11] Patent Number: 5,210,142
[45] Date of Patent: May 11, 1993

[54] REDUCTION OF MELT FRACTURE IN LINEAR POLYETHYLENE

[75] Inventors: Lawrence T. Kale, Edmonton; Lionel H. Dagenais, Fort Saskatchewan, both of Canada; Shih-Yaw Lai, Sugarland, Tex.; William R. Van Volkenburgh, Lake Jackson, Tex.; John O. Bieser, Lake Jackson, Tex.

[73] Assignee: The Dow Chemical Company, Midland, Mich.

[21] Appl. No.: 835,162

[22] Filed: Feb. 13, 1992

[51] Int. Cl.$^5$ .............. C08L 23/06; C08L 23/08; C08L 23/16
[52] U.S. Cl. .............................. 525/240; 525/53; 525/88; 525/95
[58] Field of Search ................ 525/240, 53, 88

[56] References Cited

U.S. PATENT DOCUMENTS

| | | | |
|---|---|---|---|
| 3,920,782 | 11/1975 | Cogswell | 264/98 |
| 4,348,349 | 9/1982 | Kurtz | 264/564 |
| 4,705,829 | 11/1987 | Kwack et al. | 525/240 |
| 4,824,912 | 4/1989 | Su | 525/240 |
| 4,855,360 | 8/1989 | Duchesne et al. | 525/187 |
| 4,861,834 | 8/1989 | Audureau et al. | 525/194 |
| 5,010,130 | 4/1991 | Chapman, Jr. et al. | 525/199 |
| 5,015,693 | 5/1991 | Duchesne et al. | 525/187 |

OTHER PUBLICATIONS

Cook, D. G., R. Cooke, and A. Rudin in "Use of Chilled Die Lips to Improve Production Rates in Extrusions of PE", *Intern. Polymer Processing IV*, vol. 2, pp. 73–77 (1989).

*Primary Examiner*—Carman J. Seccuro, Jr.

[57] ABSTRACT

Polymer blends of at least one ethylene interpolymer product and at least one linear polyethylene are disclosed. The blends have a shear rate at the point of onset of melt fracture at least about 2 percent higher than that obtained for the linear polyethylene alone. The polymer blends are particularly useful for forming films and tapes wherein the melt fracture of the polymer blend is substantially reduced or eliminated, thereby improving extrudability and fabricated article appearance.

11 Claims, No Drawings

REDUCTION OF MELT FRACTURE IN LINEAR POLYETHYLENE

FIELD OF THE INVENTION

A broad molecular weight distribution (BMWD) ethylene interpolymer product is blended into a narrow molecular weight distribution (NMWD) linear polyethylene to decrease melt fracture of the NMWD linear polyethylene during extrusion. The polymer blends have a shear rate at the onset of melt fracture at least about 2 percent higher than that of the linear polyethylene. The preferred level of the BMWD ethylene interpolymer product is about 15 percent by weight of the final polymer blend. Fabricated articles, such as blown film and mono-tape, made from the polymer blends have decreased melt fracture and thus improved processability.

1. Cross-Reference to Related Applications

This application is related to application Ser. No. 07/773,375, filed Oct. 7, 1991, the disclosure of which is incorporated herein by reference.

2. Background of the Invention

In order to be formed into useful fabricated articles, thermoplastic polymers such as polyethylene usually are thermally formed into the appropriate shape. Such fabrication processes include fiber melt spinning, blown and cast film formation, and various molding technologies (e.g., blowmolding and rotomolding). During processing, melt fracture of the polymers can become a problem, especially during high speed extrusion operations. Melt fracture also limits the extrusion rate.

Melt fracture of a polymer results in surface irregularities in the thermally formed fabricated article. Such surface irregularities can be broadly classified from merely aesthetically undesirable to decreasing physical strength properties.

According to Ramamurthy in *Journal of Rheology*, 30(2), pp. 337-357 (1986), above a certain critical flow rate, observed extrudate irregularities of polymers may be broadly classified into two main types: surface melt fracture and gross melt fracture. Surface melt fracture occurs under apparently steady flow conditions and ranges in details from loss of specular gloss to the more severe form of melt fracture. Gross melt fracture occurs at unsteady flow conditions and ranges in details from regular (alternating rough and smooth, helical, etc.) to random distortions. For commercial acceptability, blown film products should be free of surface defects. The critical shear rate at onset of surface melt fracture (OSMF) and onset of gross melt fracture (OGMF) are often used to characterize polymer flow properties and are based on the changes of surface roughness and configurations of the extrudates extruded by a gas extrusion rheometer (GER).

Many approaches have been suggested to modify the flow properties of polymers. For example, it has been documented that modification of molecular structure such as decreasing the average molecular weight or increasing the breadth of molecular weight distribution, will reduce the tendency of polyolefins to undergo melt fracture. U.S. Pat. No. 4,824,912 (Su) discloses blends of linear low density polyethylene with improved extrusion properties. The composition comprises a blend of a major proportion of linear low density polyethylene and a minor proportion of each of two high density polyethylene resins, one of which is a low molecular weight resin having a melt index ($I_2$) of over 10 grams/10 minutes, and other being a high molecular weight resin having a melt index of under 1 gram/10 minutes.

In other instances, processing additives are incorporated into the polymer to reduce extrusion defects. For example, U.S. Pat. Nos. 4,855,360 and 5,015,693 (Duchesne et al.) disclose extrudable compositions comprising a thermoplastic hydrocarbon polymer, a poly(oxyalkylene) polymer and a fluorocarbon polymer.

U.S. Pat. No. 5,010,130 (Chapman et al.) discloses a polymer blend composition which has improved processability comprising a major portion of a difficultly melt processible polymer and a minor portion of (1) a fluorocarbon copolymer and (2) at least one tetrafluoroethylene homopolymer or copolymer. The composition of Chapman et al. also includes an abrasive filler.

U.S. Pat. No. 4,861,834 (Audureau et al.) discloses compositions which have improved properties, especially in film form and viewed under polarized light. Processes for the compositions' preparation are also disclosed. The compositions contain at least one modified polymer of ethylene and at least one polymer phase comprising at least one polymer containing at least 90 mole percent of units derived from at least one alpha olefin having from 3 to 12 carbon atoms and at most 10 mole percent of units derived from ethylene. The modified polymer is obtained by means of at least one free-radical initiator brought into contact with the ethylene polymer.

In still other instances, the extrusion hardware itself is modified or the processing conditions are changed.

While all of these techniques have reportedly been effective in reducing melt fracture of polymers to varying degrees, a need continues to exist for cost effective improvement, especially without adding expensive processing aids.

SUMMARY OF THE INVENTION

A novel method of reducing melt fracture in melt processing a linear polyethylene has now been discovered. The method comprises the steps of:

(A) blending
  (i) a minor amount of at least one ethylene interpolymer product having a melt flow ratio of at least about 9 and having from about 0.5 percent to about 8 percent by weight of the interpolymer product having a weight average molecular weight of at least about 1,000,000 grams/mole with
  (ii) at least one linear polyethylene having a melt flow ratio less than about 9 to form a polymer blend, and (B) extruding the polymer blend to form a fabricated article, wherein the amount of the ethylene interpolymer product is sufficient to increase the shear rate at the onset of melt fracture of the linear polyethylene by at least about 2 percent.

DETAILED DESCRIPTION OF THE INVENTION

The ethylene interpolymer products for use in this invention preferably comprise at least a first interpolymer of ethylene and at least one alpha-olefin. The alpha-olefin is a $C_3$–$C_{18}$ alpha-olefin, particularly a $C_3$–$C_8$ alpha-olefin, and especially $C_8$.

The interpolymer product can further comprise a second interpolymer of ethylene and at least one $C_3$–$C_{18}$ alpha-olefin. The first interpolymer can have the same density as the second interpolymer, but preferably has a density higher than that of the second interpolymer.

The first interpolymer comprises from about 4 to about 25 percent by weight of the interpolymer product and the second interpolymer comprises from about 75 to about 96 percent by weight of the interpolymer product.

The interpolymer products are preferably produced in a polymerization process using a multiple zone reactor in which at least one higher molecular weight ethylene interpolymer is produced in one zone of the reactor. The higher molecular weight zone of the reactor process produces up to about 50 weight percent of the total interpolymer, preferably from about 4 weight percent to about 25 weight percent, and at least one other zone produces the remaining fraction of the total interpolymer product at a lower molecular weight sufficient to obtain the desired melt index ($I_2$) and/or melt flow ratio ($I_{10}/I_2$).

The weight average molecular weight ($M_w$) of the fraction of total interpolymer produced in the higher molecular weight zone is greater than about 300,000 grams/mole, preferably greater than about 400,000 grams/mole.

Alternatively, the interpolymer products are produced by blending at least two ethylene interpolymers to produce a polymer blend conforming to the above specifications.

In another embodiment, the ethylene interpolymer product comprises at least one recycled polyethylene polymer. The recycled polyethylene polymer can be from grocery sacks (usually high density polyethylene), molded bottles (also usually high density polyethylene) or fabricated films (usually linear low density polyethylene), or combinations of these, as long as the recycled polyethylene has the specified properties.

There are several ways to manufacture both the ethylene interpolymer products and the linear polyethylenes for use in this invention. For example, U.S. Pat. No. 4,076,698, incorporated herein by reference, involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polyethyenes because of the substantial absence of branched chains of polymerized monomer units pendant from the main polymer "backbone." It is these linear polyethylenes to which the present invention primarily pertains. Linear low density polyethylene (LLDFE) and ultra low density polyethylene (ULDPE) typically have a density between about 0.88 grams/milliliter (g/ml) and about 0.94 g/ml, while linear high density polyethylene (HDPE) has a density from about 0.941 g/ml to bout 0.965 g/ml (homopolymer polyethylene). The term "linear polyethylenes" used herein means that the linear polyethylene can be ULDPE, LLDPE, HDPE, or mixtures of these.

The density of the polyethylene, as measured by ASTM D-792, is lowered by copolymerizing ethylene with minor amounts of an alpha, beta-ethylenically unsaturated alkene(s) having from 3 to 18 carbons per alkene molecule (e.g., 1-propene, 1-butene, 1-pentene, 4-methyl-1-pentene, 1-hexene, 1-octene, 1,9-decadiene and 1,7-octadiene), preferably 4 to 8 carbon atoms (e.g., 1-butene, 1-hexene and 1-octene) and most preferably 8 carbons per alkene molecule (i.e., 1-octene). The amount of the alkene comonomer is generally sufficient to cause the density of the linear low density polymer to be substantially in the same density range as low density polyethylene (LDPE), due to the alkyl side chains on the polymer molecule, yet the polymer remains in the "linear" classification; they are conveniently referred to as "linear low density polyethylene."

The use of coordination-type catalysts for copolymerizing ethylene with higher alkenes to make LLDPE and ULDPE copolymers having densities between about 0.88 g/ml and about 0.94 g/ml is disclosed variously in, e.g., U.S. Pat. Nos. 2,699,457; 2,846,425; 2,862,917; 2,905,645; 3,058,963; 4,076,698; and 4,668,752, incorporated herein by reference. The density of the linear polyethylene typically used for making the films, especially blown films, is generally about 0.935 g/ml or less, preferably from about 0.92 g/ml to about 0.935 g/ml, and especially from about 0.925 g/ml to about 0.935 g/ml. The density of the ethylene interpolymer products used in this invention is generally about 0.935 g/ml or less, preferably from about 0.92 g/ml to about 0.935 g/ml, and especially from about 0.92 g/ml to about 0.93 g/ml.

The molecular weight of the ethylene interpolymer product and the linear polyethylene useful in the present invention is conveniently indicated using a melt index measurement according to ASTM D-1238, Condition (E) (i.e., 190° C./2.16 kilograms); also known as $I_2$. The $I_2$ of the ethylene interpolymer products used to blend with the linear polyethylenes is preferably from about 0.1 grams/10 minutes to about 4 grams/10 minutes, especially from about 0.1 grams/10 minutes to about 2 grams/10 minutes and particularly from about 0.1 grams/10 minutes to about 0.55 grams/10 minutes.

Preferably, the linear polyethylene has a melt index from about 0.1 grams/10 minutes to about 10 grams/10 minutes. At least one linear low density polyethylene having a density from about 0.915 g/ml to about 0.935 g/ml is especially preferred as the linear polyethylene. The choice of melt index and density of the linear polyethylene is generally selected based upon the end use application. Especially preferred, for example, is using a LLDPE having a melt index from about 0.5 to about 2 grams/10 minutes for making blown film having increased strength.

From about 0.5 percent to about 8 percent of the interpolymer product has a weight average molecular weight of at least about 1,000,000 grams/mole, preferably from about 0.5 percent to about 6 percent and especially from about 0.5 percent to about 4 percent.

While the absolute molecular weight distribution of a polymer is measured using size exclusion chromatography (also known as gel permeation chromatography or GPC) and reported as $M_w/M_n$, the melt flow ratio is often conveniently used to indicate the molecular weight distribution of the polymer, since the $I_{10}/I_2$ ratio increases proportionally to increasing $M_w/M_n$, especially for traditional Ziegler-type polymerizations. The $I_{10}/I_2$ ratio is measured according to ASTM D-1238, Conditions (N) (190° C./10 kilograms) and (E), respectively. The melt flow ratio of the ethylene interpolymer product useful in making the polymer blends having reduced melt fracture is at least about 9, preferably from about 10 to about 30 and especially from about 10 to about 16. The melt flow ratio of the linear polyethylene is less than about 10, and preferably about 8. Molecular weight distribution variation (i.e., $I_{10}/I_2$ variation) can be achieved by many techniques, including varying catalytic conditions or reactor conditions.

Similar interpolymers can also be made by blending two or more polymers of the correct density and molecular weight, a method which would certainly be more expensive than producing the desired product directly in a single reactor or in multiple reactor zones. It is important, however, that the interpolymer(s) be well mixed when using discrete interpolymer blends.

Alternatively, variations in many commercially active processes including slurry, gas phase, and autoclave processes may be able to produce interpolymers exhibiting low block and low coefficient of friction, provided that these processes are operated in a manner consistent to make the interpolymers having the properties described herein.

Other processes for making the linear polyethylenes or the ethylene interpolymer products of the present invention can be separated into specific types such as high pressure, gas phase, slurry, solution process, and multiple catalyst systems. Such processing techniques are known to those skilled in the polymer art for making such "blends", including U.S. Pat. No. 4,438,238, which refers to films made from specified blends of two LLDPE resins.

U.S. Pat. Nos. 4,048,412, 4,269,948, 4,320,088, and 4,814,377 are process patents for high pressure Ziegler catalyst systems. U.S. Pat. Nos. 4,336,352, 4,414,369, 4,692,501, and 4,792,588 disclose slurry polymerization processes. U.S. Pat. Nos. 3,491,073, and 3,969,470 are solution polymerization process patents. U.S. Pat. No. 3,914,342 discloses another solution polymerization process whereby the ethylene and the comonomer(s) is polymerized in multiple reactors. U.S. Pat. Nos. 4,792,595, 4,874,820, 4,935,474, 4,937,299, and U.S. Pat. No. 4,939,217 disclose the use of multiple catalysts to polymerize ethylene with various comonomers. All of the above United States Patents are incorporated herein by reference.

Antioxidants, pigments, hydrophobic and/or hydrophilic agents, etc., can be incorporated into the ethylene interpolymer products or the linear polyethylenes of the present invention, to the extent that they do not interfere with the reduction in melt fracture which is obtained, although specific processing additives are not necessary. To this extent, other polymers, e.g., LDPE, can also be incorporated in minor amounts into the final polymer blend, as long as the polymers do not detrimentally affect the reduction in melt fracture.

The amount of the ethylene interpolymer product added into the linear polyethylene should be sufficient to increase the shear rate at the onset of gross melt fracture by at least about 2 percent over the OGMF shear rate of the linear polyethylene alone. The amount of the ethylene interpolymer product is generally in the range of from about 5 percent up to about 20 percent (based on the weight of the total polymer blend), preferably from about 13 percent to about 17 and especially about 15 percent. The amount of ethylene interpolymer product to be blended with the linear polyethylene is dependent on the types of linear polyethylene and ethylene interpolymer product (i.e., the desired application usually dictates the melt index and/or the density range of the suitable polymer blend).

The polymer blends comprising the linear polyethylenes and a minor amount of the ethylene interpolymer products can be made from discrete polymer blends on a dry pellet to pellet basis, or the blends can be made in in-situ polymerized (multiple) reactor blends. The blends can also be made by introducing a side stream of the selected ethylene interpolymer product directly into a freshly polymerized linear polyethylene for thorough mixing and subsequent pelletization.

Fabricated articles advantageously made from the polymer blends include films (such as blown film, cast film, extrusion coated film and tape), fibers (such as staple fiber, spunbonded fabric, and melt blown fiber manufacture), tapes and other molded articles using techniques commonly known to those skilled in that particular art. Useful devices can also be formed from the fabricated articles, including, e.g., grocery bags, trash bags, woven monotape bags and the like.

Molecular Weight Fraction Determination

The molecular weight fractions of the ethylene interpolymer products are analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3% by weight solutions of the samples are prepared for injection. The flow rate is 1.0 milliliter/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the equation:

$$M_{polyethylene} = a * (M_{polystyrene})^b$$

In this equation, $a = 0.4316$ and $b = 1.0$. Weight average molecular weight, $M_w$, is calculated in the usual manner according to the formula:

$$M_w = R\ w_i * M_i$$

where $w_i$ and $M_i$ and are the weight fraction and molecular weight respectively of the ith fraction eluting from the GPC column.

Rheological Measurements

The capillary rheological measurements are measured by a gas extrusion rheometer. The gas extrusion rheometer (GER) is described by M. Shida, R.N. Shroff and L.V. Cancio in Polym. Eng. Sci., Vol. 17, no. 11, p. 770 (1977), and in "Rheometers for Molten Plastics" by John Dealy, published by Van Nostrand Reinhold Co. (1982) on page 77, the disclosures of both being incorporated herein by reference.

All GER experiments are performed at a temperature of 190° C., at nitrogen pressures between 5250 to 500 psig (4.5 to 0.0009 MPa) using a 0.0296 inches (0.075 cm) diameter, 20:1 L/D die. An apparent shear stress vs. apparent shear rate plot is used to identify the melt fracture phenomena.

EXAMPLE 1

An ethylene/1-octene copolymer having a melt index of about 0.63 grams/10 minutes, a density of about 0.924 g/ml and $I_{10}/I_2$ ratio of about 9.6 is used as the ethylene interpolymer product and is blended at varying percentages with an ethylene/1-octene copolymer (in this example, used as the linear polyethylene) having a melt index of about 1 gram/10 minutes, a density of about 0.926 g/ml and $I_{10}/I_2$ ratio of about 8. About 3.94 percent of this ethylene interpolymer product also has a weight average molecular weight of about 1,000,000 grams/mole or more. The blends are made by dry blending preweighed portions of the pellets and subsequently the dry blend is added to an extruder for melt fracture testing. The polymer blend is tested for onset of melt fracture using a 1.25 inch diameter (3.17 cm) single screw Killion extruder equipped with a 1 inch (2.54 cm) by 0.042 inch (1.07 mm) slot die. During extrusion, parameters such as output (in grams/sec), extrusion or gate pressure (psi), motor amperage and melt temperature (targeted at 212° C.) are recorded at the listed screw speeds. Determination of the onset of melt fracture is made using both the extrusion parameters and surface quality examination of the extruded tapes using an optical microscope. The onset of melt fracture in these polymer blends as measured using shear rate versus the percentage of the ethylene interpolymer product added to the linear low density polyethylene are summarized in Table 1.

TABLE 1

| Trial | Percent of Interpolymer product added | Onset of surface irregularity Shear rate (sec$^{-1}$) | Shear Stress (MPa) |
|---|---|---|---|
| A* | 0 | 241 | .344 |
| B | 5 | 246 | .302 |
| C | 10 | 245 | .302 |
| D | 15 | 446 | .428 |
| E* | 20 | 205 | .283 |
| F* | 100 | >662 | >.869 |

*Comparative Example only

The detailed experimental extrusion conditions for 5, 10, 15, and 20 weight percent of the polymer blends made from the ethylene interpolymer product blended into the linear low density polyethylene are shown in Tables 2-7. The last column in each table indicates the amount of surface irregularity and comments on each of the mono-tape samples collected. Thus, the addition of 5 and 10 weight percent of this particular ethylene interpolymer product to this particular LLDPE increased the critical shear rate at the onset of melt fracture by about 2 percent. However, the melt fracture was more severe in the case of the 20 percent blend. The preferred level of ethylene interpolymer product added to this particular linear polyethylene is about 15 percent (by weight of the total polymer blend).

The polymer blends of this invention are useful in areas where melt fracture of polyethylene during manufacture of films and tape is a problem, especially in the preparation of blown film from linear polyethylenes having a melt index of from about 0.5 to about 1.5 g/10 minutes and relatively narrow molecular weight distributions (less than about 8 $I_{10}/I_2$).

TABLE 2

LLDPE plus 5 percent ethylene interpolymer product (Trial B)

| RPM | PSI | Amps | g/s | Shear Stress MPa | Shear Rate sec$^{-1}$ | Percent surface irregularity/ comments |
|---|---|---|---|---|---|---|
| 2.5 | 230 | 4.2 | 0.1633 | 0.0845 | 43.5 | 0, smooth |
| 4 | 355 | 5.2 | 0.2700 | 0.1306 | 71.8 | 0, haze* |
| 6 | 470 | 6 | 0.3768 | 0.1729 | 100.3 | 0, haze |
| 8 | 590 | 6.8 | 0.5062 | 0.2170 | 134.7 | 0, haze |
| 10 | 660 | 7.5 | 0.6424 | 0.2427 | 171.0 | 0, haze |
| 12 | 745 | 8.1 | 0.7526 | 0.2740 | 200.3 | 0, haze |
| 14.5 | 820 | 8.7 | 0.9260 | 0.3016 | 246.4 | 19** |
| 17.5 | 925 | 8.9 | 1.100 | 0.3402 | 292.6 | 33 |
| 20 | 1010 | 9.6 | 1.275 | 0.3714 | 339.3 | 48 |
| 25 | 1135 | 10.1 | 1.614 | 0.4174 | 429.5 | 43 |
| 30 | 1280 | 11.6 | 1.983 | 0.4707 | 527.8 | 67 |
| 35 | 1390 | 12.2 | 2.337 | 0.5112 | 622.0 | 67 |
| 50 | 1690 | 14.9 | 3.372 | 0.6215 | 897.3 | 80 |

*OSMF
**OGMF

TABLE 3

LLDPE plus 10 percent ethylene interpolymer product (Trial C)

| RPM | PSI | Amps | g/s | Shear Stress MPa | Shear Rate sec$^{-1}$ | Percent surface irregularity/ comments |
|---|---|---|---|---|---|---|
| 2.5 | 255 | 4.1 | 0.1753 | 0.0938 | 46.7 | 0, smooth |
| 4 | 375 | 5.3 | 0.2759 | 0.1379 | 73.4 | 0, haze* |
| 6 | 490 | 6.2 | 0.3871 | 0.1802 | 103.0 | 0, haze |
| 8 | 585 | 6.4 | 0.5055 | 0.2151 | 134.5 | 0, haze |
| 10 | 670 | 7.5 | 0.6342 | 0.2464 | 168.8 | 0, haze |
| 12 | 765 | 8.5 | 0.7691 | 0.2813 | 204.7 | 0, haze |
| 14.5 | 820 | 8.5 | 0.9197 | 0.3016 | 244.7 | 22** |
| 17.5 | 945 | 9.5 | 1.121 | 0.3475 | 298.4 | 89 |
| 20 | 1020 | 10 | 1.278 | 0.3751 | 340.1 | 87 |
| 25 | 1190 | 10.9 | 1.638 | 0.4376 | 435.9 | 80 |
| 30 | 1310 | 12 | 1.991 | 0.4818 | 529.9 | 69 |
| 35 | 1425 | 12.7 | 2.366 | 0.5241 | 629.5 | 67 |
| 50 | 1720 | 14.5 | 3.07 | 0.6326 | 815.7 | 80 |

*OSMF
**OGMF

TABLE 4

LLDPE plus 15 percent ethylene interpolymer product (Trial D)

| RPM | PSI | Amps | g/s | Shear Stress MPa | Shear Rate sec$^{-1}$ | Percent surface irregularity/ comments |
|---|---|---|---|---|---|---|
| 2.5 | 250 | 4.2 | 0.1230 | 0.0919 | 32.7 | 0, smooth |
| 4 | 375 | 5.5 | 0.2791 | 0.1379 | 74.3 | 0, haze* |
| 6 | 485 | 6.2 | 0.3979 | 0.1784 | 105.9 | 0, haze |
| 8 | 575 | 7 | 0.5180 | 0.2115 | 137.8 | 0, haze |
| 10 | 670 | 8.3 | 0.6439 | 0.2464 | 171.3 | 0, haze |
| 12 | 770 | 8.5 | 0.775 | 0.2832 | 206.2 | 0, haze |
| 14.5 | 845 | 8.6 | 0.9251 | 0.3107 | 246.2 | 0, haze |
| 17.5 | 945 | 9.6 | 1.114 | 0.3475 | 296.4 | 0, haze |
| 20 | 1010 | 9.5 | 1.293 | 0.3714 | 344.0 | 0, haze |
| 25 | 1165 | 10.6 | 1.677 | 0.4284 | 446.4 | 16** |
| 30 | 1320 | 12.6 | 2.021 | 0.4855 | 537.9 | 13 |
| 35 | 1440 | 14.5 | 2.366 | 0.5300 | 629.7 | 8 |
| 50 | 1725 | 17.2 | 3.338 | 0.6344 | 888.3 | 3 |

*OSMF
**OGMF

TABLE 5

LLDPE plus 20 percent ethylene interpolymer product
(Comparative Trial E)

| RPM | PSI | Amps | g/s | Shear Stress MPa | Shear Rate sec$^{-1}$ | Percent surface irregularity/ comments |
|---|---|---|---|---|---|---|
| 2.5 | 225 | 4.2 | 0.1610 | 0.0827 | 42.8 | 0 |
| 4 | 365 | 5.5 | 0.2671 | 0.1342 | 71.1 | haze* |
| 6 | 475 | 6.3 | 0.3866 | 0.1747 | 102.9 | haze |
| 8 | 590 | 7.6 | 0.5230 | 0.2170 | 139.2 | haze |
| 10 | 690 | 8.5 | 0.6514 | 0.2538 | 173.4 | haze |
| 12 | 770 | 8.9 | 0.7716 | 0.2832 | 205.3 | 20** |
| 14.5 | 870 | 9.3 | 0.9433 | 0.3200 | 251.0 | 20 |
| 17.5 | 960 | 10.2 | 1.130 | 0.3531 | 300.6 | 94 |
| 20 | 1030 | 10.2 | 1.293 | 0.3788 | 344.0 | 100 |
| 25 | 1190 | 11.2 | 1.662 | 0.438 | 442.4 | 100 |
| 30 | 1320 | 11.8 | 2.020 | 0.4855 | 537.6 | 100 |
| 35 | 1435 | 13.4 | 2.392 | 0.5278 | 636.5 | 100 |
| 50 | 1745 | 15 | 1.064 | 0.6414 | 283.1 | 100 |

*OSMF
**OGMF

TABLE 6

Extrusion data for the ethylene interpolymer product alone
(Comparative Trial F)

| RPM | PSI | Amps | g/s | Shear Stress MPa | Shear Rate sec$^{-1}$ | Percent surface irregularity/ comments |
|---|---|---|---|---|---|---|
| 2.5 | 340 | 5.3 | 0.1240 | 0.1250 | 33.0 | 0, haze* |
| 4 | 495 | 6.4 | 0.2790 | 0.1820 | 74.3 | 0, haze |
| 6 | 610 | 7.3 | 0.4768 | 0.2243 | 126.9 | 0, haze |
| 8 | 680 | 8.2 | 0.5216 | 0.2501 | 138.8 | 0, haze |
| 10 | 790 | 8.8 | 0.6320 | 0.2905 | 168.2 | 0, haze |
| 12 | 860 | 9.7 | 0.7827 | 0.3163 | 208.3 | 0, haze |
| 14.5 | 950 | 10.1 | 0.9189 | 0.3494 | 244.5 | 0, haze |
| 17.5 | 1070 | 10.9 | 1.118 | 0.3935 | 297.5 | 0, haze |
| 20 | 1140 | 11.7 | 1.298 | 0.4193 | 345.4 | 0, haze |
| 25 | 1260 | 13.3 | 1.607 | 0.4634 | 427.7 | 0, haze |
| 30 | 1380 | 14.2 | 1.930 | 0.5075 | 513.6 | 0, haze |
| 35 | 1510 | 14.7 | 2.263 | 0.5553 | 602.3 | 0, haze |
| 50 | 1800 | 16.8 | 3.266 | 0.6620 | 869.0 | 0, haze |

*OSMF

TABLE 7

Extrusion data for the linear LLDPE alone
(Comparative Trial A)

| RPM | PSI | Amps | g/s | Shear Stress MPa | Shear Rate sec$^{-1}$ | Percent surface irregularity/ comments |
|---|---|---|---|---|---|---|
| 2.5 | 260 | 5.1 | 0.1834 | 0.0956 | 48.8 | smooth, no defects |
| 4 | 420 | 6.4 | 0.2681 | 0.1545 | 71.3 | hazy* |
| 6 | 535 | 7.5 | 0.3846 | 0.1968 | 102.4 | hazy, more severe than 4 rpm |
| 8 | 650 | 8.4 | 0.5080 | 0.2390 | 135.2 | small scale diamond pattern |
| 10 | 710 | 8.6 | 0.6441 | 0.2611 | 171.4 | small scale diamond pattern, more severe than 8 rpm |
| 12 | 820 | 9 | 0.7561 | 0.3016 | 201.2 | well defined diamond pattern |
| 14.5 | 935 | 10 | 0.9069 | 0.3439 | 241.3 | 87% surface irregularity, 13% gross haze** |
| 20 | 1155 | 11.3 | 1.3423 | 0.4248 | 257.2 | 100% surface irregularity |
| 30 | 1470 | 13.8 | 2.0814 | 0.5406 | 553.9 | 100% surface irregularity |
| 50 | 1910 | 17.8 | 3.3775 | 0.7024 | 898.8 | 100% surface irregularity |

*OSMF
**OGMF

EXAMPLE 2

The linear polyethylene of Example 1 is blended with an ethylene interpolymer product having a melt index of about 0.6 grams/10 minutes, a density of about 0.925 g/ml and a melt flow ratio of about 10.1 at a level of about 15 percent (by weight of the total polymer blend). About 2.42 percent of the interpolymer product has a weight average molecular weight of at least about 1,000,000 grams/mole.

The polymer blend is tested on the Killion extruder as described previously. The resultant extruded tapes are evaluated for evidence of melt fracture and the results are recorded in Table 8:

TABLE 8

LLDPE plus 15 percent ethylene interpolymer product

| RPM | PSI | Amps | g/s | Shear Stress MPa | Shear Rate sec$^{-1}$ | Percent surface irregularity/ comments |
|---|---|---|---|---|---|---|
| 2.5 | 240 | 4.3 | 0.1719 | 0.0883 | 45.8 | 0, smooth |
| 4 | 380 | 5.5 | 0.2542 | 0.1398 | 67.7 | hazy* |
| 6 | 510 | 5.9 | 0.3726 | 0.1876 | 99.1 | hazy, more severe than 4 rpm |
| 8 | 605 | 6.87 | 0.4838 | 0.2225 | 128.7 | small scale diamond pattern |
| 10 | 710 | 7.6 | 0.6212 | 0.2611 | 165.3 | small scale diamond pattern, more severe than 8 rpm |
| 12 | 780 | 9 | 0.7660 | 0.2869 | 203.8 | well defined diamond pattern |
| 14.5 | 910 | 10.1 | 0.9235 | 0.3347 | 245.8 | stretched diamond pattern |
| 20 | 1080 | 10.5 | 1.3436 | 0.3972 | 357.5 | stretched diamond pattern |
| 30 | 1360 | 13.1 | 2.0008 | 0.5002 | 532.4 | 13% surface irregularity, 87% gross haze** |
| 45 | 1685 | 16.5 | 2.9579 | 0.6197 | 787.1 | 17% surface irregularity, 83% gross haze |
| 50 | 1775 | 18.3 | 3.2814 | 0.6528 | 873.2 | 20% surface irregularity, 80% gross haze |

*OSMF
**OGMF

The polymer blend exhibited about a 6 percent decrease in extrusion pressure, and about a 9 percent decrease in extruder amperage over that of the linear polyethylene alone. In addition, the linear polyethylene alone (shown in Table 7) had onset of severe gross melt fracture at a shear rate of about 241 sec$^{-1}$, while Example 2, the polymer blend of the invention, has onset of gross melt fracture of about 532 sec$^{-1}$, an increase of about 220 percent.

EXAMPLE 3 AND COMPARATIVE EXAMPLES 4 AND 5

Example 3 is blend of a commercial ethylene/1-octene copolymer (polymer G) sold for blown film use having $I_2$ of about 1 gram/10 minutes, density of about 0.92 grams/ml and $I_{10}/I_2$ of about 8 and an ethylene interpolymer product (polymer H) having a melt index of about 0.65 grams/10 minutes, a density of about 0.925 grams/ml, a melt flow ratio of about 10.2 and about 2.42 percent (by weight of the ethylene interpolymer product) having a weight average molecular weight of at least about 1,000,000 grams/mole. Example 3, and Comparative Examples 4 and 5, respectively, are polymer blends of polymer G and 15 weight percent of each of the three different high molecular weight, broad molecular weight distribution ethylene interpolymer products (polymers H, I, and J) shown in Table 9. Polymer J has about 8.3 percent (by weight of the ethylene interpolymer product) having a weight average molecular weight of at least about 1,000,000 grams/mole.

TABLE 9

| Polymer | $I_2$ (g/10 minutes) | $I_{10}/I_2$ | Density (g/ml) | OSMF** critical shear rate (1/sec) | OGMF*** critical shear rate (1/sec) |
|---|---|---|---|---|---|
| G | 0.95 | 7.8 | 0.92 | 431 | 893 |
| H | 0.6 | 10.1 | 0.925 | 600–690 | 1514 |
| I | 0.3 | >15 | 0.952 | N/D | 56 |
| J | 0.25* | >15 | 0.949 | N/D | 68 |

*$I_5$ value
***Onset of Gross Melt Fracture
N/D = Not Determioned

All polymer blends are prepared using a Haake system 90 mixing at 180° C. for 4 minutes with addition of 2000 ppm Irganox ® 1010 (made by Ciba-Geigy Corporation). Example and Comparative Examples 4 and 5 are also extruded via GER, as described earlier. A comparison of the shear stresses and corresponding shear rates before the onset of gross melt fracture is listed in Table 10.

Surprisingly, the critical shear rate at the onset of gross melt fracture for the polymer blend of Example 3 is substantially higher than for polymer G (the linear polyethylene alone) as well as higher than Comparative Examples 4 and 5, which represents an increase of about 20-40 percent of output rate in extrusion.

TABLE 10

| Property | Example 3 | Comparative Example 4 | Comparative Example 5 |
|---|---|---|---|
| $I_2$ | 0.91 | 0.67 | 0.64 |
| $I_{10}/I_2$ | 8 | 8.96 | 9.1 |
| OSMF* critical shear rate (1/sec) | 562–719 | N/D | N/D |
| OGMF** critical shear rate (1/sec) | 911 | 726 | 502 |

*Onset of Surface Melt Fracture
**Onset of Gross Melt Fracture
N/D = Not Determined

EXAMPLES 6–7

An ethylene/1-octene linear polyethylene having a melt index of about 1 gram/10 minutes and a density of about 0.92 g/ml and a melt flow ratio of about 8 is dry blended with an ethylene interpolymer product having a melt index of about 0.4–0.7 grams/10 minutes, a density of about 0.956–0.963 g/ml and a melt flow ratio of about 18–21 at a level of about 25 percent (by weight of the total polymer blend). About 2.1–2.4 percent of the interpolymer product has a weight average molecular weight of at least about 1,000,000 grams/mole. For Examples 6–8, the ethylene interpolymer product is recycled from pigmented blow molded polyethylene bottles. When the polymer blend is processed on a one inch Killion extruder, film is produced without melt fracture and at lower extrusion pressure versus the linear polyethylene alone. When the polymer blend is processed on a 2.5 inch Gloucester blown film line, the polymer blend shows lower extrusion pressure, lower amperage, better bubble stability and no melt fracture when compared with the linear polyethylene alone.

EXAMPLE 8

An ethylene/1-octene linear polyethylene having a melt index of about 0.85 gram/10 minutes and a density of about 0.92 g/ml and a melt flow ratio of about 8.5 is dry blended with the ethylene interpolymer product of Examples 6 and 7 at a level of about 25 percent (by weight of the total polymer blend). When the polymer blend is processed on a 3.5 inch blown film line at temperatures of about 420°–430° F. at rates of about 250 pounds/hour, film is produced with excellent bubble stability and only slight melt fracture.

What is claimed is:

1. A method of reducing melt fracture in melt processing a linear polyethylene comprising the steps of:
   (A) blending
     (i) a minor amount up to about 15 percent by weight of the final polymer blend of at least one ethylene alpha olefin interpolymer product comprising a higher molecular weight ethylene interpolymer and a lower molecular weight ethylene interpolymer, said interpolymer product having a density of about 0.935 grams/ml or less, a melt index from about 0.1 grams/10 minutes to about 4 grams/10 minutes, a melt flow ratio of at least about 9 and having from about 0.5 percent to about 8 percent by weight of the interpolymer product having a weight average molecular weight of at least about 1,000,000 grams/mole with
     (ii) at least one linear polyethylene having a melt flow ratio less than about 9 to form a polymer blend, and
   (B) extruding the polymer blend to form a fabricated article, wherein the amount of the ethylene interpolymer product is sufficient to increase the shear rate at the onset of melt fracture of the linear polyethylene by at least about 2 percent.

2. The method of claim 1 wherein the linear polyethylene is selected from the group consisting of ULDPE, LLDPE and HDPE.

3. The method of claim 1 wherein the ethylene interpolymer product comprises at least one recycled polyethylene polymer.

4. The method of claim 1 wherein the linear polyethylene has a melt index from about 0.1 grams/10 minutes to about 10 grams/10 minutes.

5. The method of claim 4 wherein the interpolymer product has from about 0.5 percent to about 6 percent based on the weight of the interpolymer product of a weight average molecular weight of at least about 1,000,000 grams/mole.

6. The method of claim 5 wherein the amount of the ethylene interpolymer product constitutes about 15 percent by weight of the polymer blend.

7. The method of claim 6 wherein the shear rate at the onset of gross melt fracture of the linear polyethylene is increased by at least about 85 percent.

8. The method of claim 7 wherein the linear polyethylene is an ethylene/1-octene copolymer.

9. The method of claim 8 wherein the ethylene interpolymer product is an ethylene/1-octene copolymer.

10. The fabricated article formed by the method of claim 1.

11. The fabricated article of claim 10 selected from the group consisting of film, fiber and tape.

* * * * *